June 17, 1969    D. D. CALL    3,449,962
GYROSCOPE FRICTION ERECTION MECHANISM
Filed Sept. 29, 1965

Inventor:
Daniel D. Call.
By Griffin and Branigan
Attys

Inventor:
Daniel D. Call.
By Griffin and Branigan
Attys

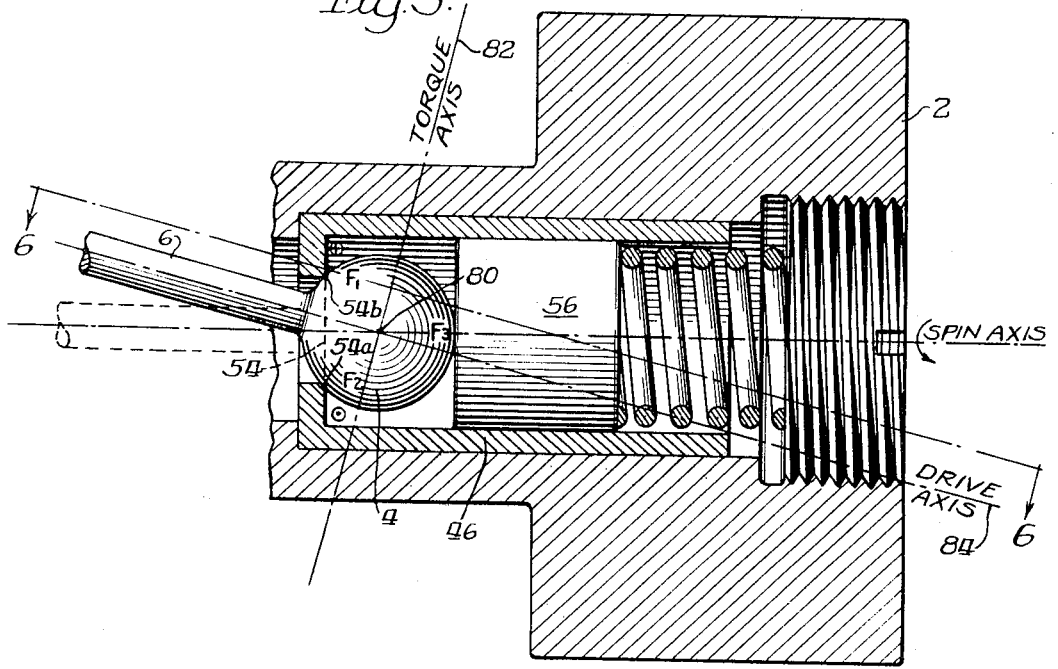
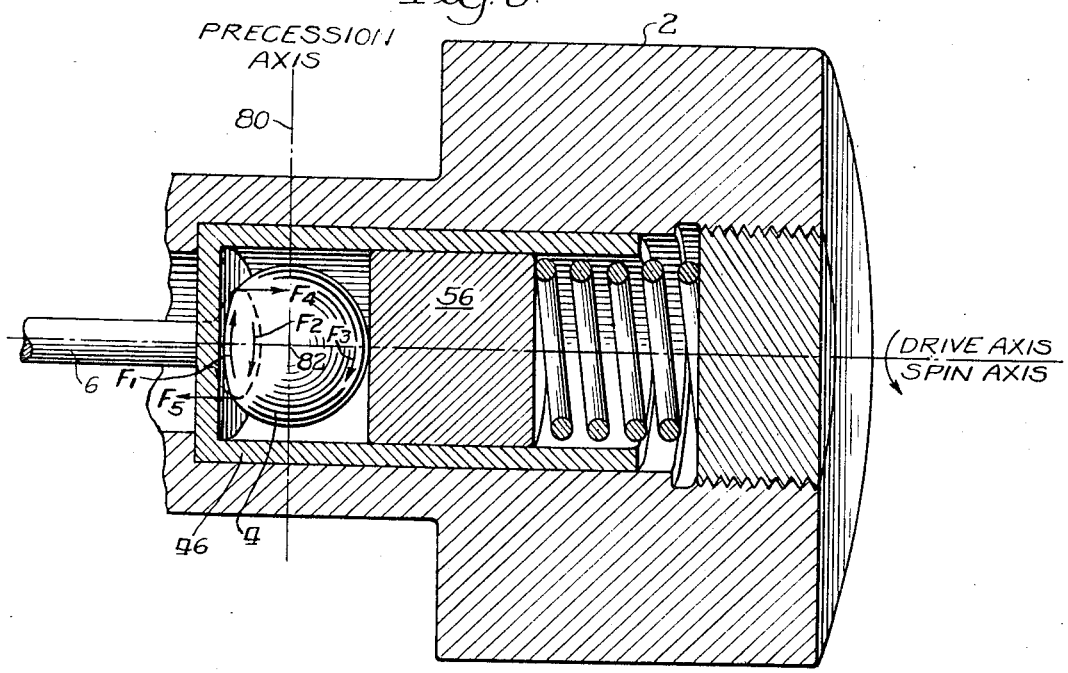

United States Patent Office 3,449,962
Patented June 17, 1969

3,449,962
GYROSCOPE FRICTION ERECTION MECHANISM
Daniel D. Call, Mount Prospect, Ill., assignor to Bell & Howell Company, Chicago, Ill., a corporation of Illinois
Filed Sept. 29, 1965, Ser. No. 491,133
Int. Cl. G01c 19/06
U.S. Cl. 74—5.7
16 Claims

ABSTRACT OF THE DISCLOSURE

There is herein disclosed a friction erection-drive mechanism for a gyroscope rotor wherein the rotor is driven by means of a spherically surfaced element which is connected to the output shaft of a drive motor and rotated thereby. The coupling between the spherically surfaced element's drive shaft and the motor drive shaft is comprised of a resilient sleeve adapted to accommodate minor misalignments between the two shafts; and a rigid outer sleeve encasing the resilient sleeve for preventing the thusly coupled shafts from whipping as they are driven by the drive motor. The driving sphere's shaft extends into the rotor through a circular aperture in a plastic bearing-material. A flat faced plug, also of a plastic bearing-material, is spring-biased so as to urge the driving sphere against the circular opening. The plastic elements conform to the surface irregularities on the driving sphere thereby eliminating the normal nutational tendencies of point contact friction erection devices.

---

This invention relates to a gyroscopic device and more particularly to an improved friction erection-drive mechanism for a gyroscope rotor.

One quite satisfactory apparatus for stabilizing an element in space is to connect it either electrically or mechanically to a gyro rotor which is relatively spatially stable. Sometimes, the rotor is mounted in a gimbal suspension system which forms a part of an instrument housing within which both the gyro and the thusly stabilized element may be housed. Other times the rotor is merely mounted on a rapidly rotated spherical element positioned at the rotor's center. The rotor is then spun about a spin axis by the frictional forces between it and the surface of the sphere. In this manner, although the rotor is spun about its spin axis by the sphere, it is nevertheless free to move about the spherical surface so that its spin axis diverges from the sphere's drive axis. A spherical driving element of this type is more fully described in U.S. Patent No. 2,815,584 entitled, "Gyro Combining Limited Freedom and Angular Rate Sensitivity," to J. R. Watson which issued in December of 1957. In still other cases, as in a preferred embodiment of the instant invention which will be described shortly, the rotor is both spherically driven and gimbal suspended.

By using the Watson type of spherical drive to stabilize a given one or more of an instrument's element it is possible to not only isolate the element from undesired vibrations, but also to provide that the element be of the "self-erecting" type. That is, the device has a characteristic that the element will automatically follow and strive steadily to align itself with the axis of the rotor's driving member so that the element always tends to become aligned with the instrument.

When these gyroscopic stabilization devices are intended to be used in mass production it is generally desirable to use as many commercially available components as possible. In other words it is desirable to avoid the manufacture of specialized components. In order to provide a driving motor with a shperical drive element on the end of its output shaft it is necessary to either specially manufacture such a drive motor or else couple a separate spherically ended shaft to the output shaft of a standard drive motor. The latter alternative is the more desirable. When a rigid coupling is used to connect the motor's output shaft to the driving sphere's shaft the driving sphere is subjected to a certain amount of run-out. Hence, a rotor mounted on the end of a thusly coupled driving sphere is subjected to wobble and nutation. It is an object of this invention, therefore, to provide a means for coupling a motor's output shaft to a rotor's driving shaft in a manner whereby the rotor is substantially free of nutational tendencies caused by minor misalignments between the two shafts.

If the spherical driving element is mounted on a specially designed one piece motor drive shaft, any misalignment between the motor's shaft and the gimbal suspension system associated with the rotor introduces undesirable forces on the rotor and its gimbal system whereby the rotor nevertheless has a tendency to wobble and nutate. Consequently, even a specially manufactured drive motor shaft does not solve the nutation problem.

One means for avoiding the nutation problems of a relatively rigid shaft coupling would appear to be to join the two shafts by means of a flexible coupling such as, for example, a rubber sleeve. This however, permits a whipping action in the sphere's drive shaft which also causes nutation of the rotor. Consequently, it is another object of this invention to provide a coupling that will accommodate shaft misalignment and still eliminate the whipping action that is attendant with the above described flexible coupling.

It has become quite common to erect a rotor by means of frictional forces between a friction erection pin on the rotor and an associated spherical surface. Frequently, however, undesirable random friction forces arise between the rotor's friction erection element and the spherical erecting surface upon which the erecting element rests. These random friction forces are caused by irregularities on the associated spherical surface and also give rise to nutation of the rotor. These random forces can be decreased by using a friction ring type of erecting element rather than the pin type. In this manner, the friction erecting forces are derived from a circle of contact with the sphere rather than the point contact of the pin, the circle riding on the sphere's high spots and unable to dip into depressions. Where the spherical surface is used to both drive and erect a high-stabilization-sensitivity rotor, however, this solution is also ineffective as will now be discussed.

Where stabilizing rotors are driven by means which are independent of associated friction erection systems, the above described nutational tendencies are almost indiscernable, especially for devices using relatively large rotors. Where the rotor is both driven and erected by means of a single spherically surfaced element, however, the nutational tendencies of the rotor due to the friction erection elements become quite pronounced. This is particularly true where the self erected rotor is intended to have a high degree of sensitivity. That is, where the rotor is intended to maintain its spatial stability against relatively high frequency, low amplitude vibrations; but is desired to follow very low frequency high amplitude movements. This type of sensitivity in extremely desirable in the case of mechanisms for stabilizing the lenses of cameras, telescopes, field glasses, or other optical instruments against vibratory motions. In the case of a movie camera, for example, if the photographer is standing on a vibrating platform the vibrations are recorded on successive frames of film which, when magnified during projection, produce a picture that is unpleasant to view and in some instances unintelligible. This type of vibration is filtered out of a highly sensitive gyroscopic lens stabilization system. Particularly in the case of movie cameras, however, a photographer often desires to obtain a panoramic view of a particular subject. Hence, the user swings the camera through an arc about his body as an axis. This operation is normally referred to as "panning" and represents the extremely high amplitude, low frequency movement which it is desired that the gyro rotor follow rather than filter out. It is in a device for accomplishing this that the invention has particular utility.

As illustrated in the above described Watson patent, a spherically driven rotor must have more than mere single point contact with the driving sphere. Moreover, when a generally circular driving contact is used the circular friction element on the rotor must be urged into contact with the sphere. If the contact between the urging element and the driving sphere is too large, such as if it is circular or spherical, the added frictional forces become so great that the rotor looses its sensitivity to stabilize against high frequency vibrations. If, on the other hand, the urging element is in point contact with the drive sphere any surface irregularities of the drive sphere once again cause nutation. When, as here, it is desired to combine gyro sensitivity with self erection at very low frequencies, it is also desired that the rotor's circular friction element be urged against the sphere by only a point contact element. In this manner the friction erection force can be made as small as possible commensurate with adequate driving friction between the rotor's circular friction element and the sphere.

Consequently, it is another object of the invention to provide an improved spherically driven rotor assembly which is highly sensitive to high frequency vibrations but nevertheless self erecting insofar as low frequency motions are concerned.

It is still another object of this invention to provide a friction erection element which is insensitive to surface irregularities of the associated spherical surface.

As noted above, the rotor of the instant device is driven by means of a spherically surfaced element which is connected to the output shaft of a drive motor and rotated thereby. In accordance with the principle of the invention the coupling between the spherically surfaced element's drive shaft and the motor drive shaft is comprised of a substantially cylindrical sleeve of a resilient material that is adapted to accommodate minor misalignments between the two shafts. This relatively resilient sleeve is then encased in a rigid outer sleeve which prevents the thusly coupled shafts from any appreciable whipping action as they are driven by the drive motor.

The driving sphere's shaft extends into the rotor through a substantially circular aperture in the rotor wherein the surfaces defining the aperture are comprised of a plastic bearing-material. The driving sphere which is thusly located within the rotor is urged against the circular opening by means of a relatively flat face of a spring biased plug also comprised of a plastic bearing-material. Although the plug appears to contact the driving sphere at a point, it is adapted to conform to surface irregularities on the driving sphere by virtue of its relative plasticity. In this manner, the normal nutational tendencies of point contact friction erection devices are eliminated, but the amount of the plug's surface that contacts the sphere is nevertheless very small. Similarly, the driving surface at the ring of frictional contact between the driving sphere and the rotor is adapted to conform to the surface irregularities of the rotor while maintaining a contact surface therewith that is only sufficient to drive the rotor.

An advantage of the invention is that the driving sphere can be manufactured with relatively high tolerances and therefore manufactured at a lesser expense than prior art devices.

The nutritional problems of the prior art devices caused by surface irregularities of the driving sphere tended to increase as the driving sphere became worn. A decided advantage of the instant invention is that both the conformable circular driving element and the conformable friction erection plug readily adapt themselves to the changes in the sphere's surface caused by wear.

The foregoing and other objects, features, and advantages of the invention will be apparent from the following more particular description of preferred embodiments thereof, as illustrated in the accompanying drawings wherein the same reference numerals refer to the same parts throughout the various views. The drawings are not necessarily intended to be to scale, but rather are presented so as to illustrate the basic principles of the invention in clear form.

In the drawings:

FIG. 5 is a schematic illustration of the frictional forces upon the surface of the driving sphere in FIG. 2, when viewed from the side at a time when the drive axis of the erecting sphere is moved out of alignment with the spin axis of the rotor;

FIG. 6 is a schematic illustration of the frictional forces upon the erecting sphere of FIG. 5 when viewed along the lines 6—6 in FIG. 5 also at a time when the drive axis of the erecting sphere is moved out of alignment with the spin axis of the rotor;

Figure 1:
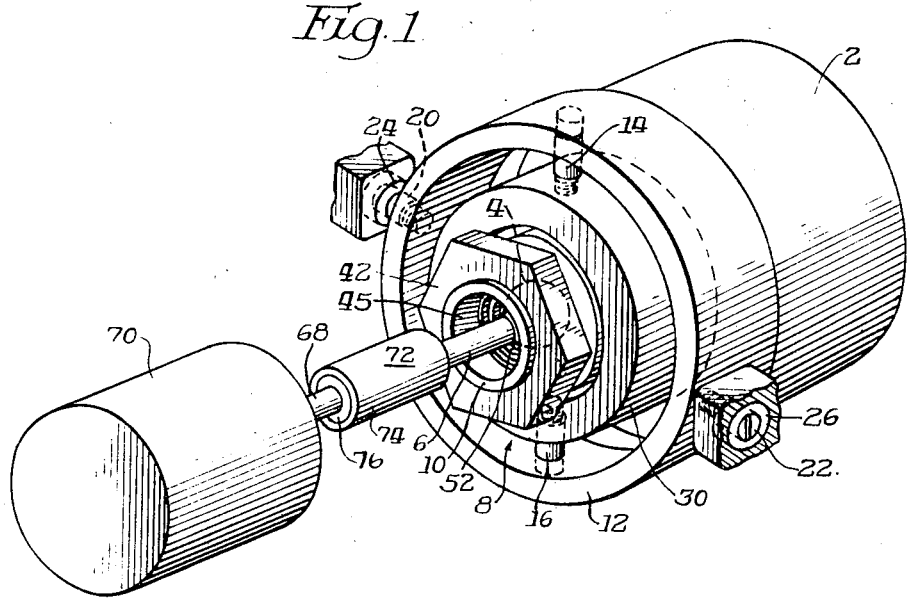
FIG. 1 is a perspective view of a gyroscopic stabilization mechanism incorporating therein a preferred embodiment of the invention.
Figure 2:
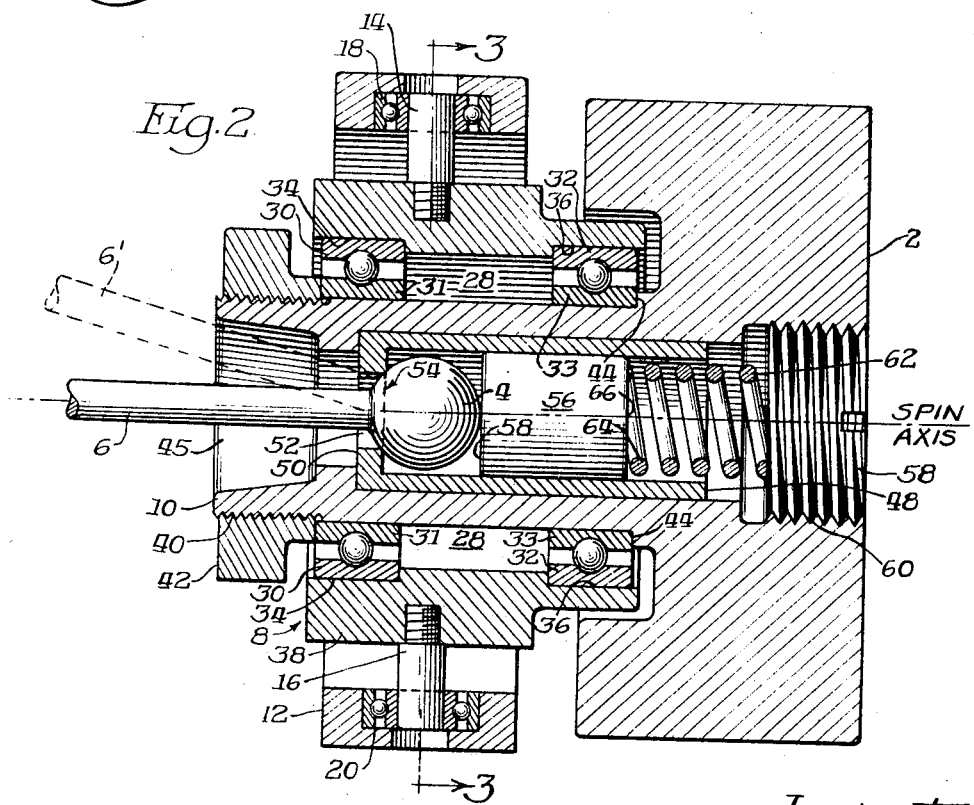
FIG. 2 is an enlarged vertical sectional view taken along the axis of the rotor of FIG. 1.
Figure 3:
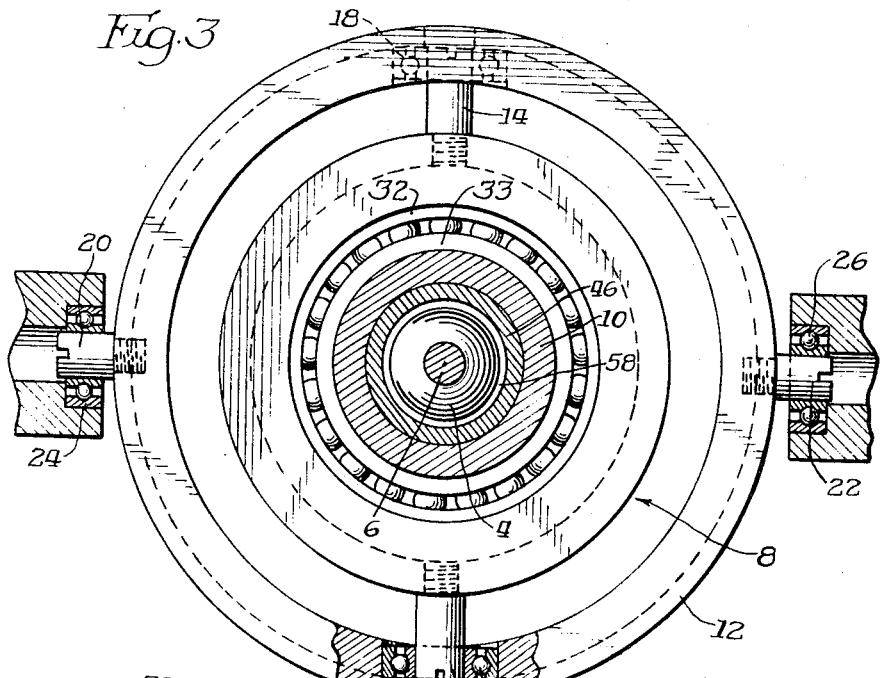
FIG. 3 is a sectional view of the invention shown in FIG. 1 taken along the lines 3—3 in FIG. 2.

Referring to the drawings, a preferred embodiment of the invention will now be described. In FIG. 1 a rotor 2 is driven by an internally located spherical ball 4 which is affixed to the end of a driving shaft 6. The rotor is free to spin about its axis within a bearing assembly 8 (FIG. 2) which surrounds a rotor support arm 10. The bearing assembly 8 is pivotally mounted in a gimbal ring 12 by means of gimbal pins 14 and 16 which are mounted in bearing assemblies 18 and 20 of the gimbal ring 12 (FIGS. 2 and 3). The gimbal ring 12 is in turn pivotally mounted with respect to the instrument housing (not shown) within which the device of the invention is located. This pivotal mounting of the gimbal ring 12 is accomplished by means of gimbal pins 20 and 22 which are affixed at one of their ends to the gimbal ring and have the other ends thereof mounted in bearing assemblies 24 and 26 of the instrument housing. In this manner, the rotor 2 is pivotable about the horizontal axis defined by the gimbal pins 20 and 22 and also about the vertical axis defined by the gimbal pins 14 and 16.

The rotor 2 has its support arm 10 thereof extending to the left through a central opening 28 in the bearing assembly 8. The outer races 30 and 32 of a set of bearings are pressed into recesses 34 and 36 of a bearing block 38 which comprises the bulk of the bearing assembly 8. The inner races of the bearing assemblies 31 and 33 are pressed onto the rotor support arm 10. As is best shown in FIG. 2 the left end of the support arm is threaded at 40 to receive a retaining nut 42. The retaining nut is fastened so that it and a shoulder 44 on the rotor 2 are snugged up against the inner races of the bearing assemblies 31 and 33 respectively. The rotor therefore, is rotatable about an axis through the center of the main bearing assembly 8. This axis is referred to as the rotor's spin axis. The rotor, with respect to the instrument housing therefore, is free to both spin about its spin axis and move in pitch and yaw about the axes defined by the gimbal pins. This relative motion of the rotor may then be transmitted to an element which it is desired to stabilize, such as a lens element of a camera for example, by means of either a suitable linkage system connected to the main bearing block 38, a selsyn sensing device, or some other similarly suitable system.

In FIGS. 1 and 2 the shaft 6 extends from the left into a relatively wide central opening 45 of the rotor support arm 10. The driving sphere 4, mounted on the end of the shaft 6, is located in the center of the rotor support arm and has its own center substantially in the plane defined by the above described gimbal pins. The rotor support arm's central opening is lined by a sleeve member 46 which is opened at its right end 48 but closed at its left end 50 except for an aperture 52 for generously accommodating the shaft 6. In this manner the shaft is free to move relative to the sleeve's axis into a position such as its phantom position 6', for example. The aperture 52 has an inner circle of contact 54 with the driving sphere 4. There is a sufficient clearance, however, between the surface of the driving sphere and the inner surface of the sleeve 46 (FIG. 3) so that the sleeve only contacts the driving sphere at the circle of contact 54 irrespective of the position of the shaft 6 with respect to the sleeve. That is to say, the sphere does not contact the substantially cylindrical inner wall of the sleeve.

A substantially cylindrical plug 56 is located within the sleeve 46 and has a substantially flat end 58 thereof in what appears to be point contact with the driving sphere 4. This plug 56 is comprised of a cold flow material. That is, a material that is adapted to conform to the surface irregularities of the driving sphere 4 without the necessity for the application of either relatively high temperatures or pressures and still provide a suitable bearing material. Although any suitable cold flow type of bearing material can be used the following types of trademarked materials have been used and found to be variously satisfactory: Delrin, nylon, and Teflon.

A threaded plug member 58 is inserted into a correspondingly threaded recess 60 located about the axis of the rotor 2. A spring 62 is also located within the sleeve 46. The left end 64 of the spring 62 bears against the right end 66 of the plastic bearing-plug 56 and urges the plug's flat end 58 into its apparent point contact engagement with the driving sphere 4. The force of the plug 56 upon the sphere 4 in turn urges the left side of the sphere in FIG. 2 into engagement with the circle of contact 54 on the inner portion of the sleeve's aperture 52. The force exerted by the plastic bearing-plug 56 upon the sphere 4 and hence the force exerted by the circle of contact 54 upon the sphere can be varied by adjusting the position of the threaded plug 58 to change the force of the spring 62.

Figure 4:
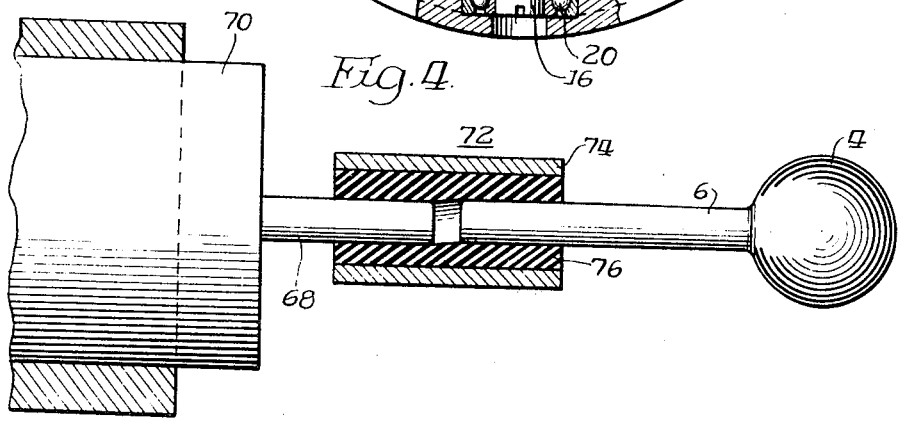
FIG. 4 is an enlarged fragmentary vertical sectional view taken along the axis of the drive shaft in FIG. 1 and illustrating the coupling between the motor shaft and the driving sphere's shaft.

As shown in FIGS. 1 and 4 the output shaft 68 of a motor 70 is connected to the driving sphere's shaft 6 by means of a sleeve assembly 72. The sleeve assembly is comprised of a relatively rigid outer member 74 such as, for example, a piece of steel tubing and an inner member 76 which is a conformable material. The thusly conformable sleeve 76 surrounds the two shafts 6 and 68, but because of its conformable or resilient nature is adapted to "take-up" minor misalignment between the two shafts. The outer sleeve 74, on the other hand, because of its rigid nature prevents the shafts from wobbling with respect to each other when the shaft 6 is driven by the shaft 68, as will be described in more detail shortly.

The motor 70, powered by any suitable means not shown, drives the shaft 6 through the sleeve assembly 72. As the sphere 4 is in turn rotated by the shaft 6 the frictional forces between it, the circle of contact 54, and the flat face 58 of the plastic bearing-plug 56 cause the rotor to spin about its geometric axis within the bearing assemblies 31 and 33. As the rotor spins it acts as a gyroscope and hence is stable in space about its spin axis. As the instrument housing moves in space the shafts 68 and 6, and the sphere 4 move with it. The rotor, however, although spinning, otherwise remains relatively stationary in space. This is represented in FIG. 2 where the shaft 6' has been pivoted so that its axis is no longer in alignment with the geometric or spin axis of the rotor 2.

It will be apparent from the above brief description that as the instrument housing is subjected to vibrations the circle of contact 54 moves across the surface of the driving sphere 4 a distance determined by the amplitude of the vibrations at least insofar as low amplitude, high frequency vibrations are concerned. Because of the relatively small frictional forces between the conformable sleeve 46 and the driving sphere as well as between the conformable plug 56 and the sphere, the rotor is extremely sensitive to high frequency vibrations. In many cases, however, it is desired that the rotor follow the motion of the instrument housing. As noted above, a common example of this is when a photographer takes a panoramic view of a particular scene. When the lenses of the panned camera are gyroscopically stabilized the stabilized lenses must nevertheless follow the photographer's panning motions. It is in a device of this type that the friction erection system of the invention is adapted to erect the rotor so that its spin axis is very slowly brought into alignment with the displaced axis of the drive shaft 6. This is accomplished by the gyroscopic action of the above described rotor.

Figure 7:
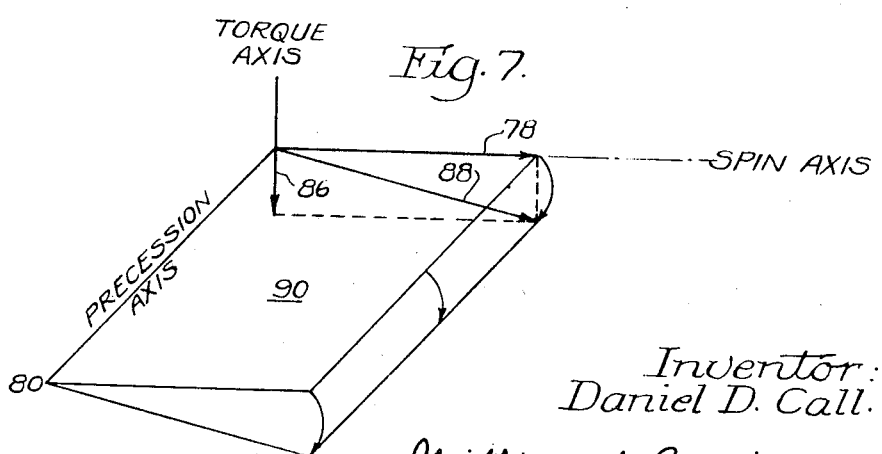
FIG. 7 is a vector diagram illustrating the precessive action of the rotor whereby it erects itself into alignment with the drive axis of the erecting sphere.

Referring to FIGS. 5 through 7 an aspect of the invention will be described whereby the rotor 2 is erected by means of the friction forces between the driving sphere 4 and the rotor's sleeve 46 at the circle of contact 54 as well as the friction forces between the plastic bearing-plug and the driving sphere 4. Assume that the rotor is spinning in a counterclockwise direction when viewed from the right in FIG. 5. At this time the driving sphere engages the rotor's conformable sleeve at the circle of contact 54 which includes the points 54a and 54b in FIG. 5. As previously noted, the frictional forces around the circle 54 cause the rotor to spin as a result of the rotation of the driving sphere. At this time there is very little relative motion between the driving sphere and either the sleeve 46 or the plug 56. When the driving sphere is in its horizontal or neutral position (shown in phantom in FIG. 5) both the driving sphere and the rotor rotate about the axis labelled spin axis in the figure. The driving sphere, however, is free to move off of the spin axis, at which time the circle of contact 54 swings across the spherical surface 4. The driving sphere is shown in its displaced position in FIG. 5. A position such as this would occur, for example, when the associated instrument housing was moved through a vertical arc from a lower position to an upper position.

When the rotor is spinning its angular momentum causes it to maintain stability about the spin axis thereby resisting angular displacement. By the laws of conservation of angular momentum the rotor will maintain its alignment with the spin axis in the absence of any outside forces. By the familiar right hand rule the angular momentum of the spinning rotor can be illustrated by the horizontal vector 78 pointing to the right in FIG. 7 along the spin axis. That is, the vector points in the direction a right hand screw would travel if rotated in the direction of the rotor. Vector 78 is referred to as the spin vector.

As the rotor is rotated in its counterclockwise direction there is a ring of frictional forces F which occur all along the circle of contact 54. Moreover, there is a similar frictional force F3 at the point where the plug 56 contacts the sphere. This latter frictional force is caused by the relative motion between the plug as it spins about the spin axis and the sphere as it is driven about its drive axis. As soon as the two axes coincide this force substantially disappears. At point 54b the friction force, designated F1 is into the plane of the paper in FIG. 5 and represented by the conventional cross within a circle. The frictional force F2 which is exerted on the rotor at point 54a, on the other hand, is out of the paper and represented by the similarly conventional dot within a circle. The force F3 also follows the convention and is represented by a cross within a circle. In FIG. 5 the precession axis 80 is in the center of the figure and perpendicular to the plane of the paper. It is this axis about which the rotor will rotate in response to a force applied to the rotor about the torque axis which is the axis 82 in FIG. 5 substantially perpendicular to the drive axis 84. When the precession axis is viewed from above, that is when looking along the torque axis, it appears as a line which is shown as a vertical line 80 in FIG. 6. In FIG. 6, however, the torque axis 82 appears as a point extending into the plane of the paper.

Although all of the frictional forces about the ring of contact 54 are substantially equal, the respective distances from the torque axes are different. For example, the moment arm of force F1 about the torque axis 82 in FIG. 6 is greater than the moment arm of force F2 about the torque axis. Hence, the torque about the torque axis due to F1 is greater than the torque about the torque axis due to F2. The resultant torque about the torque axis, therefore, is in the direction of F1 which is clockwise in FIG. 6. Similarly, the torque about the torque axis caused by the frictional force F3 is clockwise in FIG. 6. A similar analysis can be performed for the other frictional forces around the circle of contact. In addition, these frictional forces also have a component which would appear to slide across the sphere's surface when the drive axis is inclined as in FIGS. 5 and 6. These sliding frictional forces are represented by the vectors F4 and F5 in FIG. 6 and are at right angles to the ring of contact 54. These forces act along the surface of the sphere and move back and forth with each revolution of the sphere 4. It is the totality of all of the above described frictional forces that causes the torque which leads to erection of the rotor.

By using the right hand rule the torque due to the friction forces (F1, F2, F3, F4 and F5, for example) is represented by a vector 86 in FIG. 7. It is this friction torque that acts as the outside force to move the rotor off of its spin axis. This is easily shown in FIG. 7 be resolving the two vectors 78 and 86 into vector 88. Hence, because the spin axis moves towards alignment with the torque axis, the direction of precession of the rotor in FIGS. 5-7 is in a clockwise direction as illustrated by the schematic wedge shaped element 90 in FIG. 7.

It can be seen, therefore, that when the axis of the driving sphere is moved off of the rotor's spin axis the frictional forces upon spherical surface 4 cause the rotor to precess until it has erected itself. When the rotor is erected so that the spin axis is in alignment with the drive axis there will be no more differential between the moment arms of the various frictional forces; there will be no more sliding; and the frictional force between the plug and the driving sphere diminish to substantially zero. Consequently, there is no resulting torque about the torque axis and precession ceases. It should be appreciated however, that this friction erection is a relatively slow process as compared with the previously discussed high frequency vibrations. Hence, although the rotor follows the relatively slow motions of the instrument housing, any undesired vibrations occurring during this motion are effectively filtered out.

In the prior art type of friction erection devices the friction erection means corresponding to the plug in the instant invention has either been comprised of a very large surface area in contact with the driving sphere or else a single rigid point contact element has been employed. In the former case, the friction between the erecting means and the driving sphere has been so great that the sensitivity of the gyro has been undesirably decreased. In the latter case, the frictional forces between the pin and the spherical surface become erratic whenever a surface irregularity on the rotor is encountered. These forces, having unpredictable direction, cause the rotor to nutate thereby defeating the entire purpose of highly sensitive, self erecting gyros. That is, the irregular friction forces introduce undesired vibrations into the system rather than filter them out. The ability of the erecting plug in the instant invention to cold flow or conform to the surface irregularities of the driving sphere eliminates these nutational tendencies of the rotor whereby the system retains maximum sensitivity and is nevertheless self erecting. Consequently, a device has been described for providing a friction erection element that is insensitive to surface irregularities of the associated spherical surface. Moreover, the described device provides a spherically driven rotor assembly which is highly sensitive to high frequency vibrations but nevertheless self erecting insofar as low frequency motions are concerned.

In addition, by providing that the sleeve 46, or at least the portion thereof which is in circular contact with the driving sphere, be made of a cold flow plastic bearing material of the same type that was described in connection with the friction erection plug, any problems of surface irregularities between the sleeve aperture is surface and the surface of the driving sphere are also effectively eliminated. This, however, is not of such major consequence as the effect of surface irregularities upon the frictional forces derived from the surface of plug 56.

It will also be appreciated that because of the plug's ability to conform to the surface of the sphere with which it is in immediate contact it no only tends to decrease wear on the sphere but also has the ability to adapt to the changes in the sphere's surface caused by wear.

Returning now to FIG. 2, another aspect of the invention will be discussed wherein the angular velocity of the rotor's friction erection can be varied. As previously noted, the frictional forces of the driving sphere can be varied by altering the position of the threaded plug 58 in the end of the rotor 2. In this manner, the forces of the spring 62 against the plug 56 may be varied. From the above analysis of friction erection, and remembering that the precessional velocity of the rotor is easily varied merely by moving the threaded plug inwardly or outwardly in FIG. 2. That is, when the plug is moved to the left in FIG. 2 the spring force becomes greater. Hence, when the instrument housing is moved so that the axis of the driving sphere becomes displaced from the spin axis of the rotor, the frictional forces causing erection are greater and erection occurs at a faster rate. Consequently, if it is desired to move the instrument more rapidly and still have the gyro follow the instrument it is merely necessary to tighten down on the plug 58 whereby the rotor will more rapidly follow the motion of the instrument housing.

For ease of illustration the action of the above structure has been described in connection with motion and vibration in a vertical plane. However, it will be understood that the invention disclosed herein works equally well when the motion has only a horizontal component or has both a vertical and a horizontal component.

While the invention has been particularly shown and described with reference to a preferred embodiment thereof, it will be understood by those skilled in the art that various changes in form and details may be made therein without departing from the spirit and scope of the invention.

The embodiments of the invention in which an exclusive property or privilege is claimed are defined as follows:

1. In a driving mechanism for a gyroscope rotor of the type in which the rotor is driven by frictional forces between the rotor and an associated spherically surfaced driving member the combination comprising:
   a driving means;
   a drive shaft having one end thereof connected to said driving means;
   a second shaft connected to said spherically surfaced driving element;

a resilient sleeve for connecting the other end of said drive shaft to said second shaft;

and rigid means substantially surrounding said resilient sleeve for preventing said resilient sleeve from undergoing flexure.

2. In a driving mechanism for a gyroscope rotor of the type in which said rotor is driven by frictional forces between the rotor and an associated spherically surfaced driving member, the combination comprising:

a driving means;

a drive shaft having one end thereof connected to said driving means;

a second shaft connected to said spherically surfaced driving element;

a hollow substantially cylindrical resilient connecting sleeve, said drive shaft and said second shaft being inserted into opposite ends of said sleeve, said sleeve being adapted to conform to minor misalignments between the axes of said shafts;

and a rigid outer sleeve substantially surrounding and in contact with said resilient sleeve for preventing said resilient sleeve from undergoing flexure.

3. In a driving mechanism for a gyroscope rotor of the type in which said rotor is driven by frictional forces between the rotor and an associated spherically surfaced driving member, the combination comprising:

a rotatable drive shaft connected to said spherically surfaced driving member;

a central chamber within said rotor adapted to receive said spherically surfaced driving member and having a substantially circular aperture therein through which said drive shaft extends, said aperture being smaller than the radius of said driving member;

a plastic member located within said chamber for urging said spherically surfaced driving member against the circular portion of said rotor defined by said aperture;

and means to rotate said driving shaft whereby the frictional forces at the circle of contact between said rotor and said spherically surfaced driving member cause said rotor to spin about a spin axis and the frictional forces between said plastic member and said spherically surfaced driving member tend to cause said rotor's spin axis to be superposed on the axis of said drive shaft.

4. The apparatus of claim 3 wherein said plastic member is urged towards said spherically surfaced driving element by a spring means.

5. The apparatus of claim 4 wherein the force of said spring means is variable.

6. The device of claim 3 wherein the portion of said rotor at said circle of contact is comprised of a plastic material.

7. The apparatus of claim 6 wherein said plastic member is urged towards said spherically surfaced element by a spring means.

8. The device of claim 7 wherein the force of said spring means is variable.

9. In a driving mechanism for a gyroscope rotor of the type in which said rotor is driven by frictional forces between the rotor and an associated spherically surfaced driving member, the combination comprising:

a drive shaft connected to said spherically surfaced driving member;

a substantially cylindrical channel extending through said rotor along the axis thereof;

a substantially cylindrical sleeve having a substantially circular aperture in an otherwise closed end thereof, said sleeve being fixedly mounted in said channel of said rotor, and said spherically surfaced driving member being located within said sleeve so that the drive shaft extends out of said aperture in said sleeve;

a substantially cylindrical plug of a plastic material slidably located within said sleeve;

and means adapted to urge said plug against said spherically surfaced element so that said spherically surfaced element is in substantially circular contact with the portion of said sleeve defined by said aperture;

and means to rotate said driving shaft whereby the frictional forces at said circle of contact cause said rotor to spin about a spin axis and the frictional forces between said plug and said spherically surfaced element tend to cause said rotor's spin axis to be superposed on the axis of said drive shaft.

10. The device of claim 9 wherein the surface of said plug in contact with said spherically surfaced element is substantially flat whereby the contact between said plug and the spherical surface is substantially a point contact.

11. The device of claim 10 wherein said means urging said plug into contact with said spherically surfaced element is a spring means.

12. The device of claim 11 wherein said spring force is variable.

13. The device of claim 9 wherein said sleeve is of a plastic material.

14. The device of claim 13 wherein the surface of said plug in contact with said spherically surfaced member is substantially flat whereby the contact between the plug and the spherical surface is substantially a point contact.

15. The device of claim 14 wherein said means urging said plug into contact with said spherically surfaced element is a spring means.

16. The device of claim 15 wherein the force of said spring is variable.

References Cited

UNITED STATES PATENTS

| | | | |
|---|---|---|---|
| 1,517,285 | 12/1924 | Fischedick et al. | 64—30 |
| 1,924,037 | 8/1933 | Henderson | 33—204.15 |
| 2,641,134 | 6/1953 | Kenyon | 74—5.37 X |
| 2,716,873 | 8/1955 | Byers | 64—30 X |
| 2,780,940 | 2/1957 | Brown | 74—5.7 |
| 2,815,584 | 12/1957 | Watson | 74—5.7 X |
| 3,096,453 | 7/1963 | Behar | 64—30 X |

FOREIGN PATENTS 570,366   3/1957   Italy.

C. J. HUSAR, *Primary Examiner.*